United States Patent [19]
Kruys

[11] Patent Number: 5,881,372
[45] Date of Patent: Mar. 9, 1999

[54] RADIO COMMUNICATION DEVICE AND METHOD

[75] Inventor: Jan P. Kruys, Harmelen, Netherlands

[73] Assignee: Lucent Technologies Inc., Murray Hill, N.J.

[21] Appl. No.: 566,292

[22] Filed: Dec. 1, 1995

[30] Foreign Application Priority Data

Sep. 2, 1995 [GB] United Kingdom ............ 9517943

[51] Int. Cl.$^6$ ............................................. H04B 1/04
[52] U.S. Cl. .................... 455/113; 455/37.1; 455/188.1; 455/454; 455/552; 455/556
[58] Field of Search ..................... 455/33.1, 34.1, 455/56.1, 62, 63, 67.1, 76, 86, 89, 186.1, 113, 33.2, 422, 450, 524, 550, 552, 556, 557, 558, 436, 433, 447, 37.1, 66, 188.1, 168.1, 426, 512, 454, 527–528, 553

[56] References Cited

U.S. PATENT DOCUMENTS

| 4,025,855 | 5/1977 | Atkinson | 455/113 |
| 4,227,259 | 10/1980 | Mogi | 455/151.2 |
| 4,704,585 | 11/1987 | Lind | 331/16 |
| 4,972,455 | 11/1990 | Phillips et al. | 455/552 |
| 5,075,643 | 12/1991 | Einbinder | 455/113 |
| 5,230,094 | 7/1993 | Kitching et al. | 455/186.1 |
| 5,438,245 | 8/1995 | Kii et al. | |
| 5,438,684 | 8/1995 | Schwent et al. | 455/89 |
| 5,537,674 | 7/1996 | Kishimoto et al. | 455/186.1 |
| 5,574,985 | 11/1996 | Yikotila | 455/186.1 |

Primary Examiner—William A. Cuchlinski, Jr.
Assistant Examiner—Gertrude Arthur

[57] ABSTRACT

A radio communication device, suitable for use in a portable computer, is capable of operating at any one of a set of common frequencies which are legally permissible in all countries (or a set of countries) and at any frequency on which it detects that a transmission of its own type is being used for a transmission from another device. Thus, users can legally operate the device in different countries, while manufacturers can obtain certification for use in those countries. If the user attempts to select a frequency which is not one of the common frequencies nor detected by transmission, an indication that such frequency is not available is provided to the user.

9 Claims, 4 Drawing Sheets 5,881,372

RADIO COMMUNICATION DEVICE AND METHOD

RELATED APPLICATIONS

Pursuant to 37 C.F.R. 1.78(a)(2), applicant claims the right of priority of co-pending British Patent Application 9517943.8, which was filed on Sep. 2, 1995.

FIELD OF THE INVENTION

The present invention relates to radio communication devices in general and, more particularly, to a radio communication device that is capable of operating in a plurality of jurisdictions that have differing radio transmission regulations.

BACKGROUND OF THE INVENTIONS

Currently, portable radio devices, such as portable computers having a radio communication capability and portable radio telephones, are coming into increasing use. By virtue of their portability, users may wish to take such devices across national boundaries. For example, a business person may wish to take a portable computer from his or her home country to another country on a business trip, and still maintain the possibility of communicating via radio transmissions with another computer or with a local area network ("LAN") in the country being visited. However, different countries may have differing regulations controlling the frequencies and transmission types which are permitted to be used for such radio communications. Consequently, manufacturers of such radio communication devices are faced with the need for obtaining official approval for their radio devices in a number of different countries which have differing allowable frequency ranges. It should be understood at this juncture that for a radio transmission, in addition to the frequency, the transmission type is important, by which is meant the modulation type and possibly other features, such as synchronization. For example, the transmission type may be direct-sequence spread-spectrum modulation.

SUMMARY OF THE INVENTION

A typical embodiment of the present invention provides a radio communication device that is capable of operating in a plurality of countries that have differing radio transmission regulations and that is also capable of efficiently using the allowable radio spectrum. An embodiment of the present invention may be legally operable in different countries because it can operate on a selected one of a set of common frequencies, which may correspond with frequencies which are allowable in all countries of interest, yet it can also operate on frequencies that are allowable in one or more, but not all, countries. This enables the embodiment to communicate with other devices on different frequencies in different countries without being restricted to one or a small number of frequencies common to all countries of interest. Because the radio communication device can operate on those frequencies that it detects a signal of the expected transmission type, in addition to the set of allowable frequencies, there is less spectrum waste than if operation was constrained to the set of allowable frequencies only.

In particular, one embodiment of the present invention is capable of operating according to a selected transmission type on a selected one of a plurality of operating frequencies. The embodiment comprises an input capable of receiving an input control signal representing a selected operating frequency for the radio communication device, and a frequency control unit capable of (i) determining whether the input control signal represents a selected operating frequency that is one of a set of allowable frequencies, (ii) enabling transmission on the selected operating frequency when the selected operating frequency is one of said set of allowable frequencies, and (iii) enabling transmission on the selected operating frequency only when the radio communication device detects a radio transmission of the selected transmission type on said selected operating frequency.

BRIEF DESCRIPTION OF THE FIGURES

One embodiment of the present invention will now be described by way of example, with reference to the accompanying drawings, in which.

DETAILED DESCRIPTION

Figure 1:
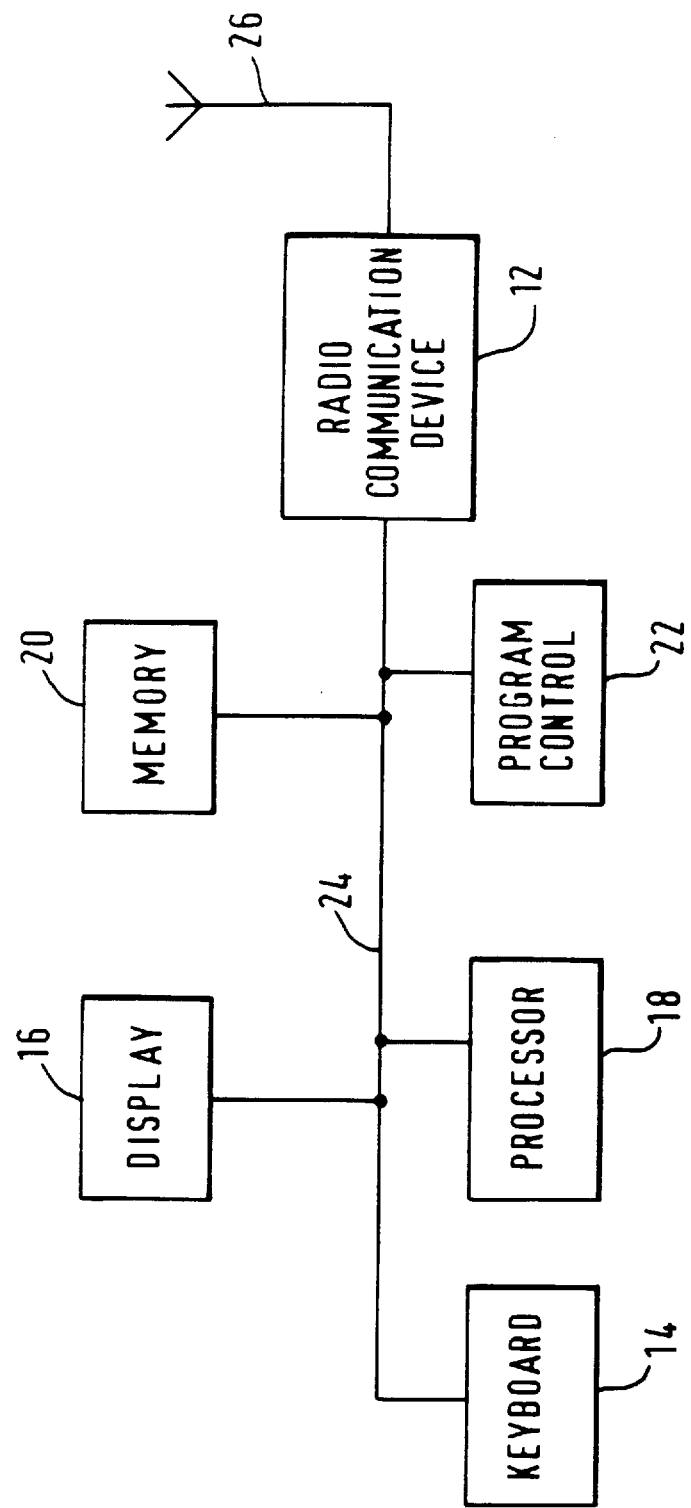
FIG. 1 is a block diagram of a portable apparatus including a radio communication device according to the invention.

Referring first to FIG. 1, there is shown a block diagram of a portable computer 10 provided with radio communication device 12 according to one embodiment of the present invention. The portable computer 10 includes keyboard 14, display device 16, processor 18, memory 20 and program control 22. The aforementioned components are interconnected, as shown by bus 24. The radio communication device 12 is coupled to antenna 26 for bi-directional radio communication with other radio devices. It will be appreciated that in a practical implementation radio communication device 12 could be embodied in a Personal Computer Memory Card International Association standard card ("PCMCIA card") which could be inserted into an expansion slot (now shown) in the computer 10.

Figure 2:
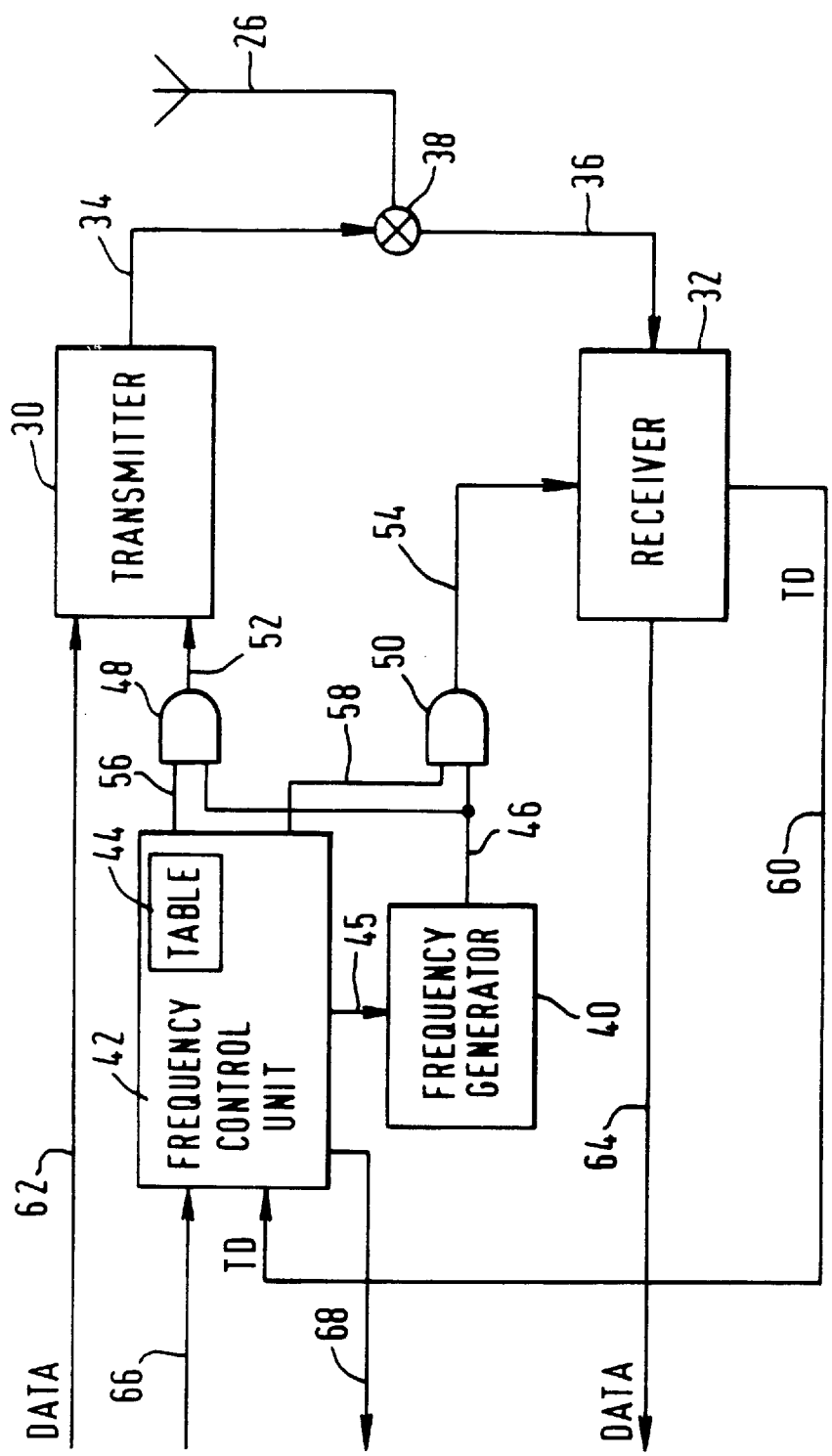
FIG. 2 is in a block diagram of the radio communication device according to the invention, included in the apparatus of FIG. 1.

Referring now to FIG. 2, there is shown a block diagram of radio communication device 12. The radio communication device 12 includes transmitter 30 and receiver 32. Output 34 of transmitter 30 and input 36 of receiver 32 are connected to coupling device 38 which is connected to antenna 26. The radio communication device 12 also includes frequency generator 40 and frequency control unit 42, which includes table 44 which is arranged to store a list of frequencies which are legally permitted in all countries of interest for radio communication. These frequencies are referred to herein as common frequencies since they are common to all countries of interest. Table 44 may also store a list of restricted frequencies, which frequencies are allowable in certain ones but not all of the countries of interest. However, in this case the list of frequencies contained in table 44 would need to distinguish those frequencies which are common frequencies from those which are restricted frequencies.

However, frequency generator 40 can generate not only the common frequencies identified in the list stored in table 44, but also the restricted frequencies, referred to above. For example, in the 2.4 GHz frequency band, some countries allow only frequencies in a part of this band to be used. Thus, for example, in the United Kingdom, wideband data systems are allowed in the range from 2.400 to 2.4835 GHz, whereas in France the lower frequency is 2.445 GHz. For a portable device, the restricted frequencies would be from 2.400 GHz to 2.445 GHz, whereas the common frequencies would be from 2.445 to 2.4835 GHz. Again, in the 5.150 to 5.300 GHz frequency band, some countries do not allow the use of frequencies in the higher 50 MHz in the 5.2 GHz band.

It should be understood that frequency generator 40 preferably includes a crystal controlled oscillator which runs at a relatively low frequency, and a controllable multiplier which is used to obtain the desired output frequencies. Frequency control unit 42 provides a control signal over line 45 to control the multiplier to an appropriate value, thereby causing the desired output frequency to be obtained. However, other forms of variable frequency generator may be utilized.

The frequency signal generated by the frequency generator 40 is applied to an output line which is connected to gates 48, 50 having output lines 52, 54 connected to transmitter 30 and receiver 32, respectively. The gates 48, 50 are provided with control signals from the frequency control unit 42 over the lines 56, 68, respectively. An output signal TD (to be explained) is provided by receiver 32 on output line 60 which is connected to frequency control unit 42.

The radio communication device 12 further has connection line 62, 64, 66 and 68, which are included in bus 24 (FIG. 1). Line 62 applies data signals to transmitter 30; line 64 receives data signals from receiver 32. Lines 66 and 68 are control line signals for the input and output of control signals to and from frequency control unit 42, respectively.

Figure 3:
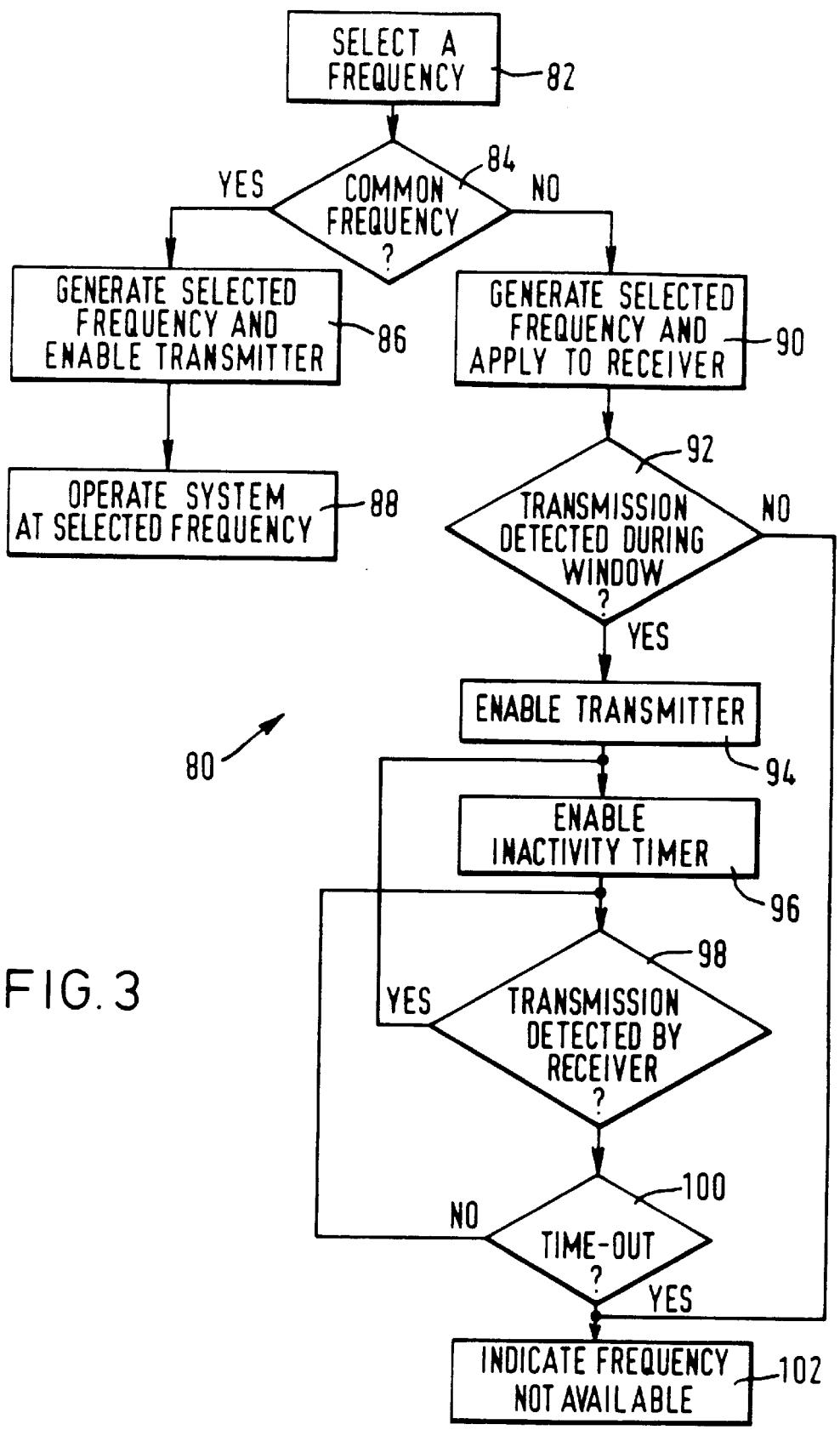
FIG. 3 is a flowchart illustrating the operation of the radio communication device.

Referring now to FIG. 3, the operation of radio communication device 12 will be described with reference to flowchart 80. As shown in block 82, the initial step is for the user to select a frequency. This selection is applied as a frequency selection signal over line 66 to frequency control unit 66. It will be appreciated that this user selection may involve the display on display device 16 (FIG. 1) of a list of frequencies which may be selected by the user. The user may then operate keyboard 14 (FIG. 1) to cause the appropriate frequency selection signal to be applied over line 66 to frequency control limit 42. In this connection, it should be pointed out that the display may be arranged to encourage the user to select a particular frequency, for example by a color indication, or by highlighting. For example, the user could be encouraged to select the lowest, or lowest available, of the common operating frequencies (allowable in all countries).

Frequency control unit 42 then makes a determination as to whether or not the selected operating frequency is one of the common frequencies listed in table 44 (block 84). If so, the flowchart proceeds to block 86. Frequency control unit 42 provides a control signal over line 45 to cause frequency generator 40 to generate the selected operating frequency, and further provides an enabling signal over line 56 to enable gate 48 to pass the generated output frequency over line 52 to transmitter 30.

Data communication device 12 is thereby conditioned to transmit data, in accordance with data signals supplied over the line 62, at the selected operating frequency (block 88).

Returning now to block 84, if it is determined that the selected operating frequency is not one of the common frequencies listed in table 44, then flowchart 80 proceeds to block 90. Frequency control unit 42 provides a control signal over line 45 to cause frequency generator 40 to generate the selected operating frequency, and further provides an enabling signal to enable gate 50 to pass the generated frequency over line 54 to receiver 32. The flowchart 80 proceeds to block 92, where it is seen that a determination is made as to whether or not the receiver detects, during a predetermined time window, a transmission at the selected operating frequency and of the same type (e.g. the same modulation and synchronization, and possibly other factors, predetermined for the system). It will be appreciated that receiver 32 receives and decodes transmissions of the type (e.g. modulation, etc.) under which the radio communication device 12 operates and transmitter 30 is adapted to transmit. For example, this type may be direct-sequence spread spectrum modulation.

If yes, a TD (transmission detect) signal is provided on line 60 and applied to frequency control unit 42 which responds by providing a signal on line 56 to enable gate 48, thereby permitting the selected operating frequency, generated by frequency generator 40, to be applied to transmitter 30 (block 94), permitting data received on the line 62 to be transmitted.

Next, the flowchart proceeds to block 96, where it is seen that an inactivity timer is activated. Then, as shown at block 98, a determination is made as to whether or not a transmission at the selected operating frequency (and of the same type, as discussed hereinabove) is detected. If a transmission is detected at the selected operating frequency, the flowchart returns to block 96 and the inactivity timer is reset. If no transmission is detected at the selected operating frequency, the flowchart proceeds to block 100, where a determination is made as to whether the inactivity timer has timed out. If not, the flowchart returns to block 98. If the inactivity time has timed out, the flowchart proceeds to block 102, where the frequency control unit 42 is caused to disable gate 48 thereby preventing further transmissions. Also, a signal is sent over line 68 to bus 24, causing an indication of that the selected operating frequency is not available to be displayed to the user on display 16. The user now has the opportunity to make another frequency selection.

Returning to block 92 in flowchart 80, if no transmission at the selected operating frequency and of the same type is detected, then the signal TD is not generated, the flowchart proceeds directly to block 102 and a signal is provided by the frequency control unit 42 over line 68 to initiate the display of an indication to the user that the frequency is not available.

In summary, there has been described a radio communication device wherein users can select any one of set of frequencies (the common frequencies) for operation of the device. Furthermore the device will operate on other frequencies (the restricted frequencies) only if a transmission of the relevant type on one of such other frequencies is detected. This has the advantage that type approval testing and certification for use can be obtained in all countries of interest or in a group of countries with overlapping frequency allocations, since in each country, the device can only operate on frequencies which are allowable in that country. Thus, the user of a portable computer, for example, can take his or her portable computer across national boundaries with other countries where the radio communication regulations may be different, yet be assured that the portable computer is still legally permitted to operate over radio communication channels in those other countries.

From a systems perspective, it will be appreciated that portable computer 10, as shown in FIG. 1, incorporating a radio communication device 12 according to the invention, can be operated in a number of different environments. For example, portable computer 10 may be utilized in a so-called "ad-hoc" network, which is a network consisting entirely of portable devices, or it may be utilized in an infrastructure network, which is a network that includes both portable and non-portable devices, wherein non-portable devices may be connected via a cable network, such as on a backbone network, rather than a wireless network. Radio communication device 12 can accommodate all these environments. For example, the user of computer 10 may, under program control, select to create or join an ad-hoc network. When creating an ad-hoc network, the user needs to utilize a frequency that is free from other users, whereas for joining an ad-hoc network the computer can be controlled to listen to activity on all available frequencies, identify the network ID code of transmissions it receives, and display these to the user, who can then make an informed selection based on the displayed network IDs. Alternatively, if a network ID is already known, this information could be entered into the computer, and all available frequencies could be listened to until the frequency is found. Joining an infrastructure network is similar, except that the range of available frequencies includes the restricted frequencies as locally applicable.

Figure 4:
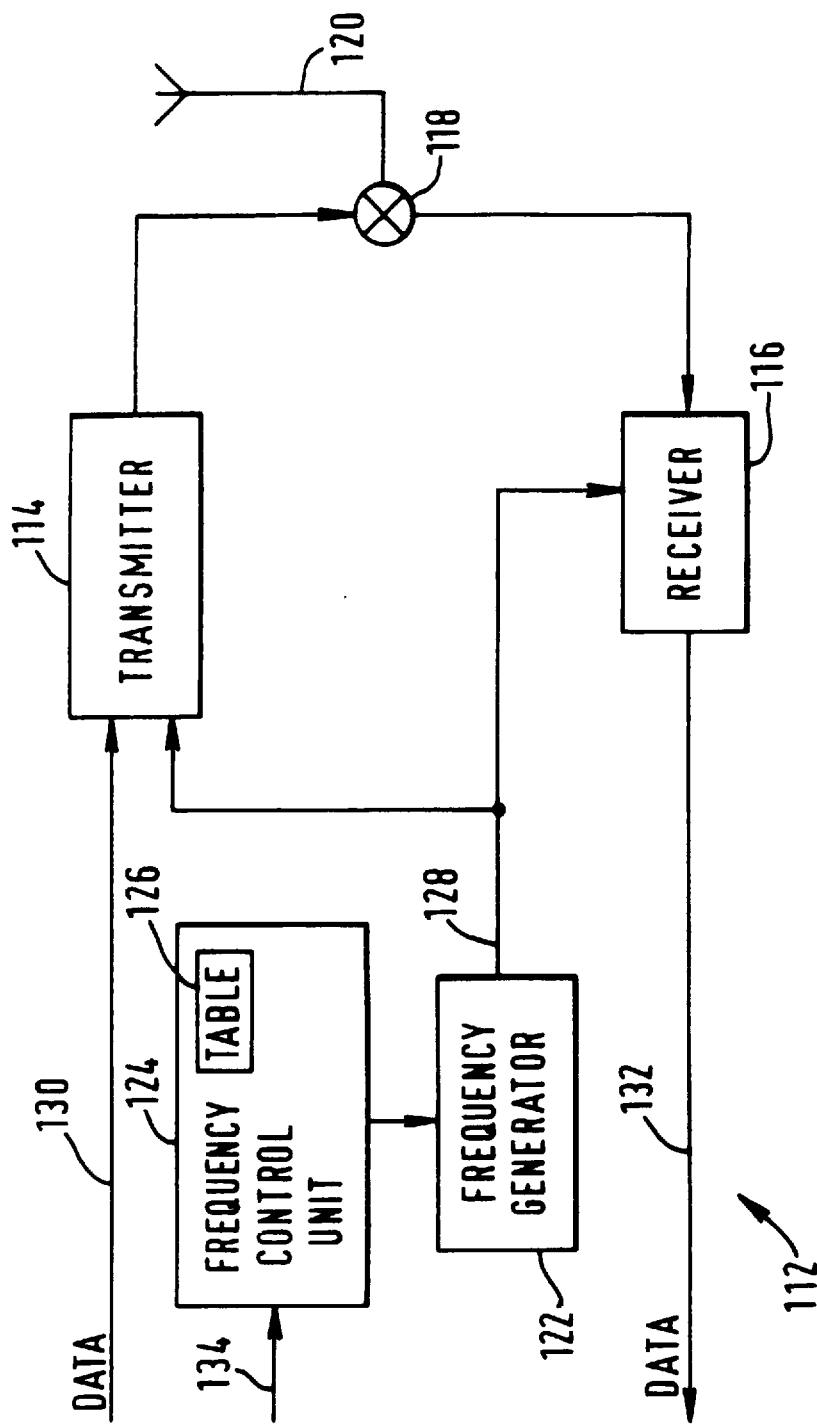
FIG. 4 is a block diagram of a radio communication device suitable for use in non-portable apparatus.

It should be understood that the non-portable computers are adapted for radio communication by utilizing a radio communication device which differs from that described hereinabove for radio communication device 12 for portable devices. Referring to FIG. 4, there will be briefly described one form of radio communication device 112, suitable for use in a non-portable computer. The radio communication device 112 includes transmitter 114 and receiver 116. An output of transmitter 114 and an input of receiver 116 are connected to coupling device 118 which is coupled to antenna 120. Radio communication device 112 also includes frequency generator 122 and frequency control unit 124, which includes table 126 which is arranged to store a list of frequencies which are legally permitted in the country in which the device 112 is being used. Frequency generator 122 is connected over line 128 to transmitter 114 and to receiver 116. Transmitter 114 receives data signals to be transmitted over line 130. Receiver 116 provides data signals received by receiver 116 over line 132. Control line 134 carries a frequency select signal representing a frequency selected by a user. It is seen that the radio communication device 112 has a simpler construction than the radio communication device 12 (FIG. 2).

In operation, radio communication device 112, the user causes a frequency select signal to be provided on line 134. It should be understood that this signal could be provided by operation of the keyboard of the computer containing radio communication device 112, or could be provided from a remote management device which supplies a frequency select signal over a backbone network. The frequency control unit determines whether the selected operating frequency is on which is listed in the table and, if so, caused frequency generator 122 to generate the selected operating frequency for application over line 128 to transmitter 114 and receiver 116, for use in the modulation and demodulation of data signals. In an alternative arrangement, the user may activate a scanning mode, which permits the verification of activity on the available channels before a selection is made. It will, of course, be appreciated that frequency selection for a non-portable device is effected only at installation time or when a frequency change is desired.

It should be understood that in a modification, the radio communication device for a non-portable computer could have the same construction as radio communication device 12 for a portable computer (FIG. 2), but such modified device would have a table identifying the common frequencies and the locally allowable frequencies, and would be controlled such that the receiver does not listen for frequencies of the same transmission type.

Although in the described embodiment, radio communication device 12 has been described as embodied in a portable computer, other applications are possible. For example, the radio communication device could be implemented in a portable telephone having a display and operating keys.

What is claimed is:

1. A method of operating a radio communication device capable of operating with a selected transmission type on a selected one of a plurality of operating frequencies, the method comprising the steps of:

generating a control signal representing a selected operating frequency for said radio communication device;

determining whether said selected operating frequency is one of a set of allowable frequencies;

when said selected operating frequency is one of said set of allowable frequencies, effecting transmission on said selected operating frequency; and when said selected operating frequency is not one of said set of allowable frequencies, ascertaining whether a transmission on said selected operating frequency and of said selected transmission type is detected and, only when a transmission at said selected operating frequency is detected, effecting transmission on said selected operating frequency.

2. The method of claim 1 wherein said step of ascertaining comprises the step of generating a signal on said selected operating frequency and determining whether or not a transmission received by said radio communication device is on said selected operating frequency and has said selected transmission type.

3. The method of claim 2 further comprising the step of providing an indication that said selected operating frequency is not available for transmission by said radio communication device, when a transmission of said selected transmission type on said selected operating frequency is not detected.

4. A method of operating a radio communication device capable of operating with a selected transmission type on a selected one of a plurality of operating frequencies, the method comprising the steps of:

determining whether the selected operating frequency is one of a set of allowable frequencies;

generating a control signal representing the selected operating frequency for the radio communication device;

effecting transmission on the selected operating frequency when the selected operating frequency is one of the set of allowable frequencies; and ascertaining whether a transmission on the selected operating frequency and of the selected transmission type is detected when the selected operating frequency is not one of the set of allowable frequencies, and effecting transmission on the selected operating frequency when a transmission at the selected operating frequency is detected.

5. The method of claim 4 wherein the step of ascertaining includes the step of generating a signal on the selected operating frequency and determining whether a transmission received by the radio communication device is on the selected operating frequency and has the selected transmission type.

6. The method of claim 5, further comprising the step of providing an indication that the selected operating frequency is not available for transmission by the radio communication device when a transmission of the selected transmission type on the selected operating frequency is not detected.

7. A radio communication device capable of operating with a selected transmission type on a selected one of a plurality of operating frequencies, comprising:

means for determining whether the selected operating frequency is one of a set of allowable frequencies;

means for generating a control signal representing a selected operating frequency for the radio communication device;

means for effecting transmission on the selected operating frequency when the selected operating frequency is one of the set of allowable frequencies; and means for ascertaining whether a transmission on the selected operating frequency and of the selected transmission type is detected when the selected operating frequency is not one of the set of allowable frequencies and for effecting transmission on the selected operating frequency when a transmission at the selected operating frequency is detected.

8. The radio communication device of claim 7, wherein the means for ascertaining includes means for generating a signal on the selected operating frequency and means for determining whether a transmission received by the radio communication device is on the selected operating frequency and has the selected transmission type.

9. The radio communication device of claim 8, further comprising means for providing an indication that the selected operating frequency is not available for transmission by the radio communication device when a transmission of the selected transmission type on the selected operating frequency is not detected.

* * * * *